US 7,346,733 B2

(12) United States Patent
Kitamura

(10) Patent No.: US 7,346,733 B2
(45) Date of Patent: Mar. 18, 2008

(54) STORAGE APPARATUS, SYSTEM AND METHOD USING A PLURALITY OF OBJECT-BASED STORAGE DEVICES

(75) Inventor: Manabu Kitamura, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/966,185

(22) Filed: Oct. 18, 2004

(65) Prior Publication Data

US 2006/0053287 A1  Mar. 9, 2006

Related U.S. Application Data

(60) Provisional application No. 60/608,098, filed on Sep. 9, 2004.

(51) Int. Cl.
*G06F 12/16* (2006.01)
(52) U.S. Cl. ..................................... 711/114
(58) Field of Classification Search ............ None
See application file for complete search history.

(56) References Cited

U.S. PATENT DOCUMENTS

| | | | |
|---|---|---|---|
| 5,148,432 A | 9/1992 | Gordon et al. | |
| 5,675,726 A | 10/1997 | Hohenstein et al. | |
| 5,752,256 A | 5/1998 | Fujii et al. | |
| 6,480,970 B1 * | 11/2002 | DeKoning et al. ............ | 714/6 |
| 6,604,165 B1 | 8/2003 | Terao | |
| 6,772,302 B1 | 8/2004 | Thompson | |
| 2003/0105922 A1 | 6/2003 | Tomita | |
| 2003/0188097 A1 * | 10/2003 | Holland et al. ............ | 711/114 |
| 2004/0098537 A1 * | 5/2004 | Serizawa .................... | 711/112 |
| 2004/0162957 A1 | 8/2004 | Don et al. | |
| 2004/0243643 A1 | 12/2004 | Hattrup et al. | |
| 2004/0260898 A1 | 12/2004 | Stanley et al. | |
| 2005/0160309 A1 | 7/2005 | Golding | |

OTHER PUBLICATIONS

Patterson et al, "A Case for Redundant Arrays of Inexpensive Disks) RAID)", Proceedings ACM SIGMOD International Conference on Management Data, 1998, pp. 109-116.
ANSI T-10, "Working Draft: Information technology—SCSI Object-Based Storage Device Commands (OSD)", Revision 09, Feb. 2, 2004, pp. i-155.

* cited by examiner

*Primary Examiner*—Hyung S. Sough
*Assistant Examiner*—Craig E Walter
(74) *Attorney, Agent, or Firm*—Mattingly, Stanger, Malur & Brundidge, P.C.

(57) ABSTRACT

An apparatus and method for a storage system for storing data on an object basis, where the object has attribute information and data. The storage system has a plurality of (N) data storage devices and at least one redundant data storage device. When the storage system receives a write request with an object, the object is divided into N sub-objects each of which have the same size. Thereafter, each of the N sub-objects is written to the data storage devices. Further, the parity is calculated from each of the sub-objects. In one embodiment the parity is stored in a redundant data storage device.

51 Claims, 16 Drawing Sheets

| Attribute Page | Attribute No. | Attribute value |
|---|---|---|
| 1 | 1 | 10000 |
|  | 2 | 10001 |
|  | 9 | David |
|  | 81 | 65536 |
| 3 | 1 | 2/1/2004  0:00 |
|  | 2 | 6/12/2004  9:24 |
|  | 3 | 5/21/2004  3:06 |
|  | 4 | 5/21/2004  3:06 |
|  | 5 | 6/12/2004  9:24 |
|  | ⋮ | ⋮ |

| Logical OSD | Physical OSD | RAID level | Stripe size | Attribute size |
|---|---|---|---|---|
| 0 | 0, 1, 2, 3 | 4 | 1KB | 10KB |
| 1 | 4, 5, 6, 7 | 5 | 256KB | 10KB |
| ⋮ | ⋮ | ⋮ | ⋮ | ⋮ |
| k | m, m+1 | 1 | - | 10KB |

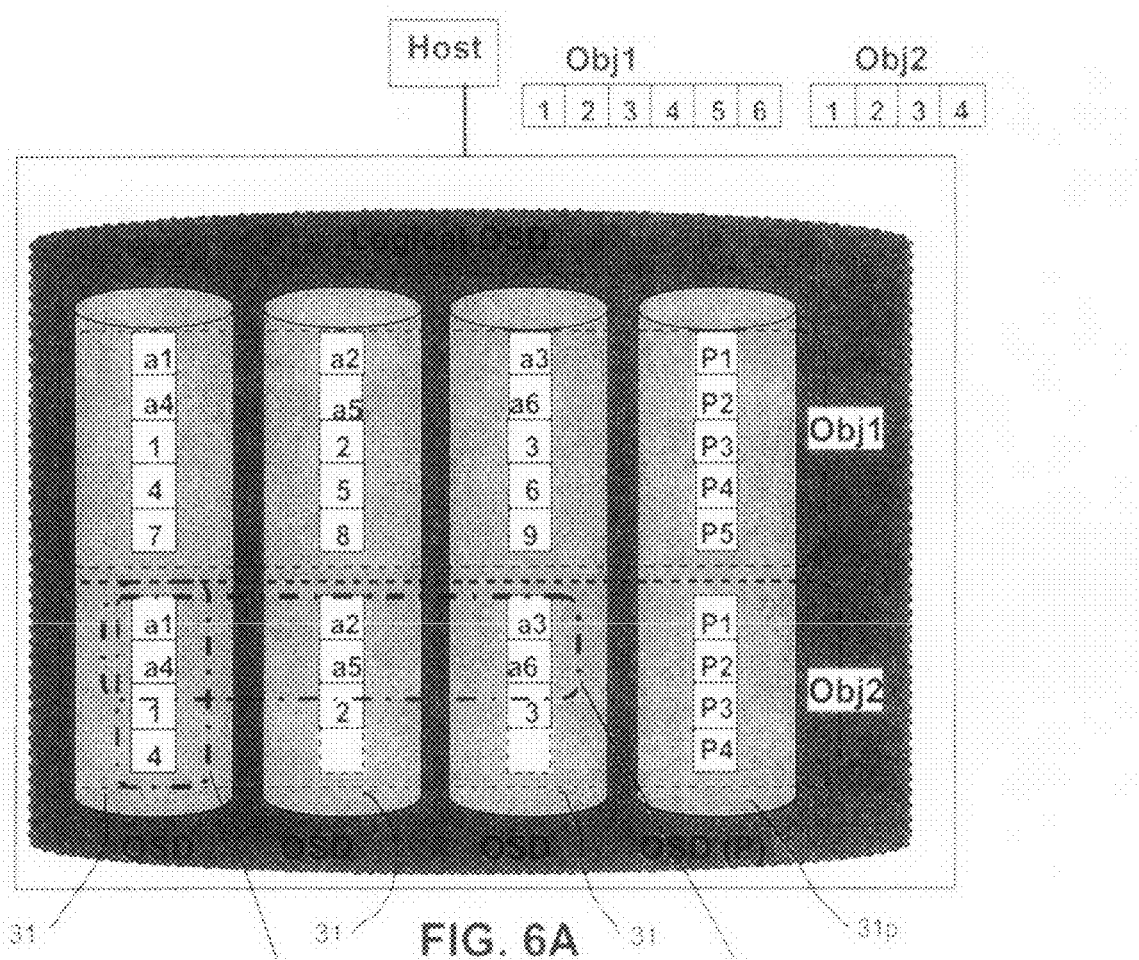
FIG. 6A
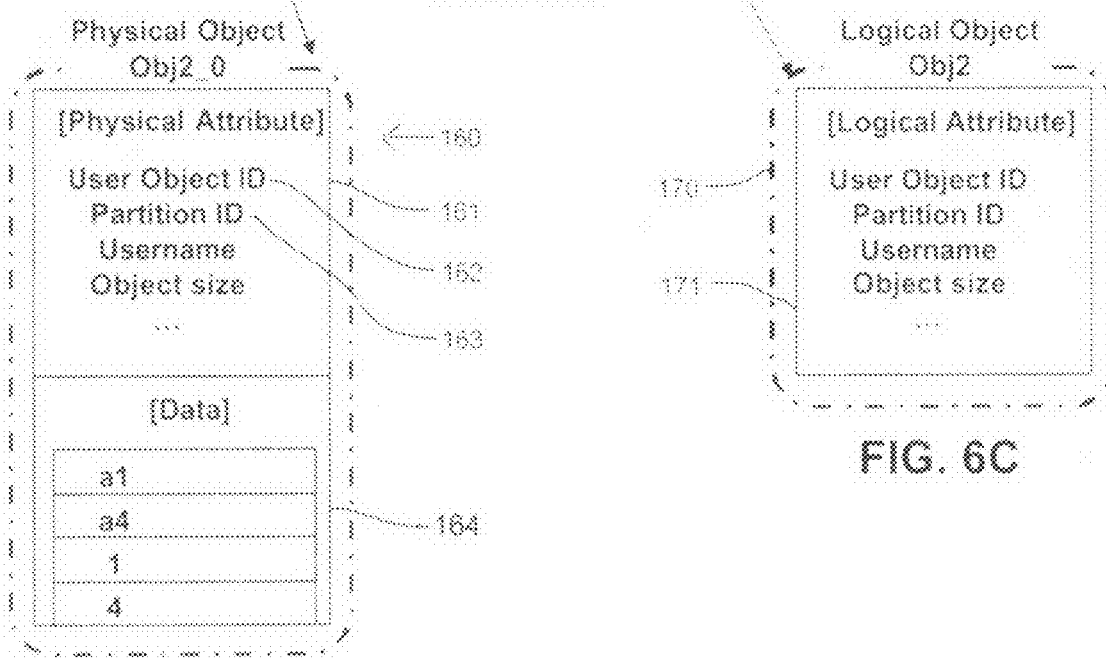
FIG. 6B
FIG. 6C

| Logical OSD | Physical OSD | RAID level | Stripe size | Attribute size | Partition ID | OSD size |
|---|---|---|---|---|---|---|
| 0 | 0, 1, 2, 3 | 4 | 32KB | 10KB | 10000 | 300GB |
| 1 | 0, 1, 2, 3 | 5 | 256KB | 10KB | 10001 | 120GB |
| ⋮ | ⋮ | ⋮ | ⋮ | ⋮ | ⋮ | ⋮ |
| k | m, m+1 | 1 | - | 10KB | 2ffff | |

| Partition ID | Object ID | [Physical OSD, Physical Object] |
|---|---|---|
| 10000 | 10000 | [0,10000]  [1,10000] |
|  | 10001 | [2,10000]  [0,10001]  [1,10001] |
|  | 10002 | [2,10001] |
|  | ⋮ |  |
| 10001 | 10000 | [0,10000]  [1,10000] |
|  | 10001 | [2,10000]  [0,10001]  [1,10001] |
|  | 10002 | [2,10001] |
|  | ⋮ | ⋮ |
| ⋮ | ⋮ | ⋮ |

FIG. 17

| Logical OSD | Physical OSD | RAID level | Attribute size | Partition ID | OSD size |
|---|---|---|---|---|---|
| 0 | 0, 1, 2, 3 | 4 | 10KB | 10000 | 300GB |
| 1 | 0, 1, 2, 3 | 5 | 10KB | 10001 | 120GB |
| ⋮ | ⋮ | ⋮ | ⋮ | ⋮ | ⋮ |
| k | m, m+1 | 1 | 10KB | 2ffff |  |

FIG. 18

STORAGE APPARATUS, SYSTEM AND METHOD USING A PLURALITY OF OBJECT-BASED STORAGE DEVICES

CROSS-REFERENCE TO RELATED APPLICATIONS

This application claims the benefit of U.S. Provisional Application No. 60/608,098, filed Sep. 9, 2004.

BACKGROUND OF THE INVENTION

1. Field of the Invention

The invention relates to disk array devices, systems, and storage methods, and more particularly to such devices, systems, and methods which include a plurality of object-based storage devices (OSDs) used for constructing a RAID-type system.

2. Description of the Related Art

Recent storage systems that are used in the high-end or mid-range computer systems usually adopt Redundant Arrays of Inexpensive (a.k.a., Independent) Disks, known as RAID architecture. There are a number of different RAID architectures, with the most common being referred to as RAID1 through RAID6.

RAID 1: A RAID 1 architecture involves providing a duplicate set of "mirror" storage units and keeping a duplicate copy of all data on each pair of storage units. While such a solution solves reliability problems, it doubles the cost of storage.

RAID 2: A RAID 2 architecture stores each bit of each word of data, plus Error Detection and Correction (EDC) bits for each word, such as Hamming Code, on separate disk drives (this is also known as "bit striping").

RAID 3: A RAID 3 architecture is based on the concept that each disk drive storage unit has internal means for detecting a fault or data error. Therefore, it is not necessary to store extra information to detect the location of an error. Instead, a simpler form of parity-based error correction can be used. In this approach, the contents of all storage units subject to failure are "Exclusive OR'd" (XOR'd) to generate parity information. The resulting parity information is stored in a single redundant storage unit. If a storage unit fails, the data on that unit can be reconstructed onto a replacement storage unit by XOR'ing the data from the remaining storage units with the parity information. However, a RAID 3 system has the same performance limitation as a RAID 2 system, in that the individual disk actuators are coupled, operating in unison. This adversely affects the random access performance of the drive array when data files are small, since only one data file at a time can be accessed by the "single" actuator. Thus, RAID 3 systems are generally not considered to be suitable for computer systems designed for On-Line Transaction Processing (OLTP) purposes, wherein the computer responds immediately to user requests, as opposed to batch processing, in which a batch of requests is stored and then executed all at one time.

RAID 4: A RAID 4 architecture uses the same parity error correction concept of the RAID 3 architecture, but improves on the performance of a RAID 3 system with respect to random reading of small files by "uncoupling" the operation of the individual disk drive actuators, and reading and writing a larger minimum amount of data (typically, a disk sector) to each disk (this is also known as block striping). A further aspect of the RAID 4 architecture is that a single storage unit is designated as the parity unit.

RAID 5: A RAID 5 architecture uses the same parity error correction concept of the RAID 4 architecture and independent actuators, but improves on the writing performance of a RAID 4 system by distributing the data and parity information across all of the available disk drives. Typically, "N+1" storage units in a set (also known as a "redundancy group") are divided into a plurality of equally sized address areas referred to as blocks. Each storage unit generally contains the same number of blocks. Blocks from each storage unit in a redundancy group having the same unit address ranges are referred to as "stripes". Each stripe has N blocks of data, plus one parity block on one storage unit containing parity for the remainder of the stripe. Further stripes each have a parity block, the parity blocks being distributed on different storage units. Parity updating activity associated with every modification of data in a redundancy group is therefore distributed over the different storage units. No single unit is burdened with all of the parity update activity.

RAID 6. A RAID 6 architecture calculates two sets of parity information instead of one so as to improve fault tolerance. In other words, even if there is a simultaneous failure on two drives of the array, RAID 6 can handle both faults, while RAID levels 1, 3, 4, or 5 cannot. In other words, RAID 6 includes any form of RAID that can continue to execute read and write requests to all of an array's virtual disks in the presence of two concurrent disk failures. Both dual check data computations (parity and Reed Solomon) and orthogonal dual parity check data have been proposed for RAID Level 6.

As described above, the current RAID techniques generate redundant information in bits, bytes, or blocks basis. However, RAID technology has not been effectively applied to the case where data is stored into the storage devices (such as magnetic disks) in an object base, instead of in the block base. A storage device that stores data as an object is called an OSD (Object-Based Storage Device).

Under OSD technology, each object comprises the data and its metadata or attributes. The Attributes include the size of data, user ID information, and so on. Since the Attributes maintain the size of data in the object, the object size is variable, which is different from the current storage devices such as HDDs (Hard Disk Drives).

When a RAID architecture is constructed using a plurality of OSDs, the problem arises as to how to determine the unit of parity generation. Since the parity (in the current RAID architecture) is generated from a plurality of data units having the same size, such as a bit, byte, or block, you have to consider how to prepare for the data blocks to create parity.

Prior art relating to storage systems and methods is as follows:

1) Patterson, D. A. et al., "A Case for Redundant Arrays of Inexpensive Disks (RAID)", *Proceedings ACM SIGMOD International Conference on Management of Data*, 1988, 109-116;
2) U.S. Pat. No. 5,675,726: Flexible Parity Generation Circuit;
3) U.S. Pat. No. 5,148,432: Arrayed Disk Drive System and Method; and
4) ANSI T-10 Working Draft: Information Technology—SCSI Object-Based Storage Device Commands (OSD): http://www.t10.org/ftp/t10/drafts/osd/osd-r09.pdf. The entire disclosures of all four of these documents are hereby incorporated by reference.

BRIEF SUMMARY OF THE INVENTION

The present invention is used for storage systems and methods in accordance with object-based storage device commands. The storage system and method of the invention includes a disk controller and a plurality of storage devices, each of which are Object-Based storage devices (OSDs). Also, the storage system of the invention processes I/O requests from a host computer in accordance with the OSD commands.

In one embodiment, the storage system of this invention includes a plurality of (for example, N) data storage devices and at least one redundant data (e.g., parity) storage device, each of which are Object-Based storage devices (OSDs). The storage system constructs a logical OSD from the plurality of data and redundant data storage devices. When the storage system receives a write request with an object, the object is divided into N sub-objects. Thereafter, each of the N sub-objects is written to the data storage devices. The identifiers of each N sub-objects is the same as the one of the object. Further, the parity is calculated from each of the sub-objects and is written to the redundant data storage device.

In another embodiment, the storage system comprises N data storage devices and at least one parity storage device that receives a write request with an object. Also, included is a mapping table between the logical objects and physical objects. Each of the physical objects has the same size. When the storage system receives a write request with an object, the object is converted into a plurality of physical objects and is stored into a plurality of data storage devices. The parity is calculated from the converted physical objects, and is stored into the parity storage device.

These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 6 illustrates how objects with data and attributes are stored in the storage devices of the invention.

FIG. 17 illustrates a logical object management table of the second embodiment of the invention.

FIG. 18 illustrates a logical OSD management table of a third embodiment of the invention.

DETAILED DESCRIPTION OF THE INVENTION

Figure 1:
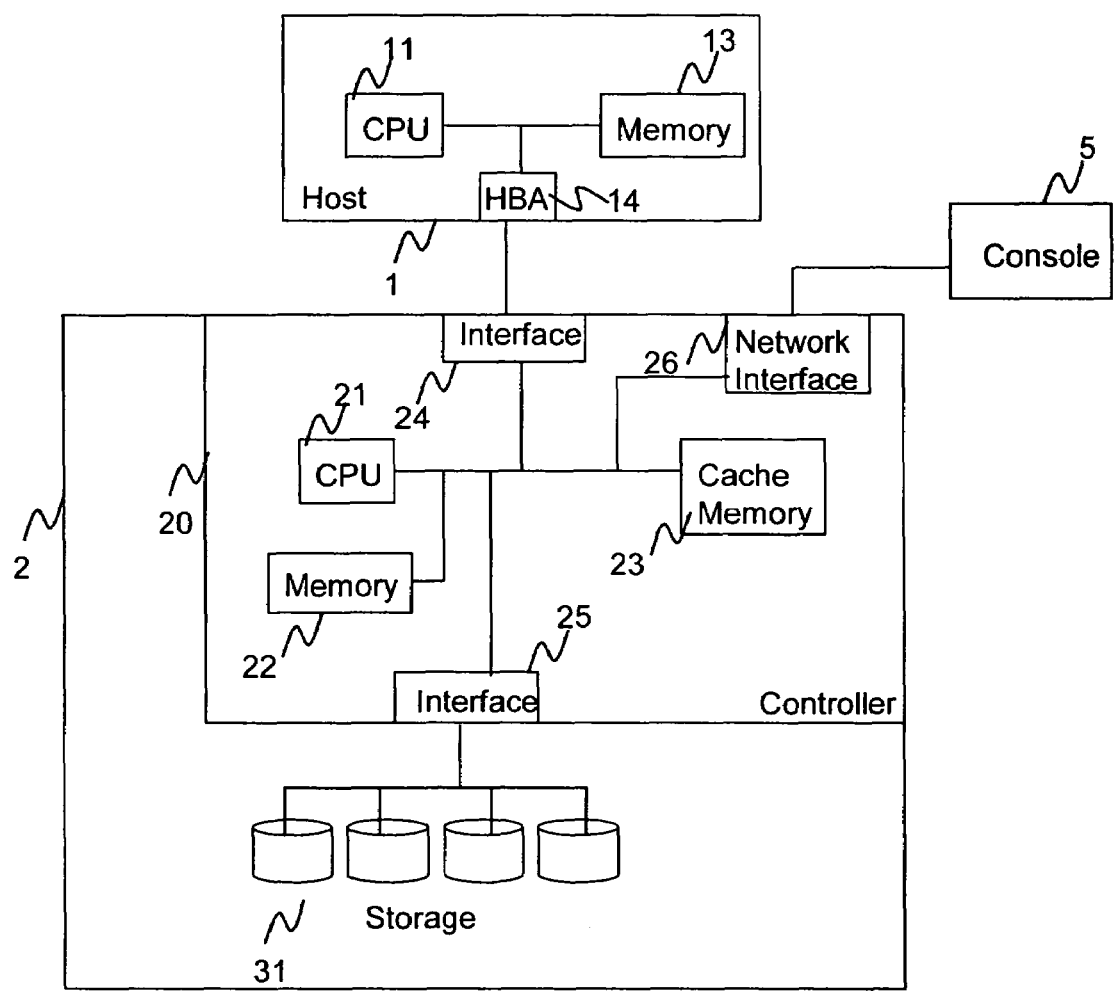
FIG. 1 illustrates a storage system of the invention.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views.

1st Embodiment

System Configuration:

FIG. 1 illustrates an exemplary first embodiment of the storage system 2 in which the system, method and apparatus of this invention is applied. Storage system 2 includes a disk controller 20, which includes a controller CPU 21, a controller memory 22, a cache memory 23, a host interface 24, a disk interface 25, and a network interface 26. Disk controller 20 processes I/O requests from a host computer 1. The I/O requests are based on the Object-Based Storage Device Commands. Controller CPU 21 and controller memory 22 function in conjunction with a program for processing I/O requests or other operations, which is stored in controller memory 22, and controller CPU 21 executes the program. Cache memory 23 stores the write data from host computer 1 temporally before the data is stored into storage devices 31, or cache memory 23 stores the read data that are requested by the host computer 1. Cache memory 23 may be a battery backed-up, non-volatile memory. In another implementation, controller memory 22 and cache memory 23 are a common combined memory. Host interface 24 is used to connect between host computer 1 and storage system 2 via host bus adapter 14. Disk interface 25 is used to connect storage devices 31 and the disk controller 20. Network interface 25 interfaces a console 5 with the storage system 2. Console 5 is used to set/change configurations of the storage system 2.

The storage system 2 includes a plurality of storage devices 31. Each of storage devices 31 processes the I/O requests in accordance with the Object-Based Storage Device commands.

Figures 2, 3:
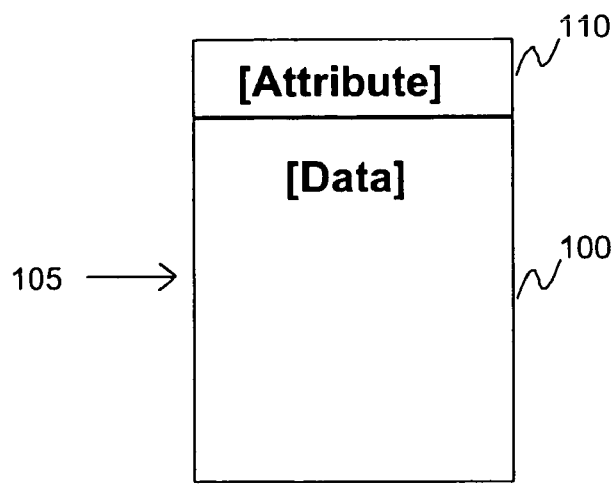
FIG. 2 illustrates an "object" of the invention.
FIG. 3 illustrates an attribute organization of the invention.

FIG. 2 illustrates an example of the "object" 105 of the present invention. As mentioned above, the storage system 2 processes I/O requests from host computer 1 in accordance with the Object-Based Storage Device commands (hereinafter, "OSD command"). In the OSD command system, host computer 1 reads/writes data from/to the storage system 2 as the "object". Object 105 comprises the "Data" 100 and "Attribute" (or 'metadata') 110, as illustrated in FIG. 2. The Attribute 110 contains the identification information of object 105. An example of attribute 110 will be described in more detail below.

Since the size of object 105 is variable, attribute 110 includes the size of the object. FIG. 3 shows an example of the attribute information 110 that the storage system 2 of the present invention maintains. Some of the attributes 110 have already been defined in standard form (such as in the ANSI T-10 Working Draft disclosed above), but vendors can define additional attributes 110 in their OSDs.

As illustrated in FIG. 3, attributes 110 are mainly composed of the three elements: attribute page 111, attribute number 112, and attribute value 113. Attributes 110 are organized in pages 111 for identification and reference. The attributes in pages 111 have similar characteristics. Each attribute value 113 is identified by the attribute page 111 and attribute number 112.

Partition_ID 131 and User_Object_ID 132 is the identification number of each object. Hereinafter, User_object_ID 132 is also referred to as "object ID" 132. Username 133 contains an identification of the user for the object specified by the host computer 1. Used capacity 134 shows the size of the object (including attribute). Created time 135 is the time that the object was created. Attribute accessed time 136 is the last time the attribute was accessed. Attribute modified time 137 is the last time the attribute was modified. Data accessed time 138 is the last time the data was accessed by the READ command, which will be described in more detail below. Data modified time 139 is the last time the data was modified by the WRITE, CREATE-AND-WRITE, or APPEND commands, which will be described in more detail below. Additional details of a conventional object are set forth in "ANSI T-10 Working Draft: Information Technology—SCSI Object-Based Storage Device Commands (OSD)", referred to above, and has been incorporated by reference.

Figures 4, 5:
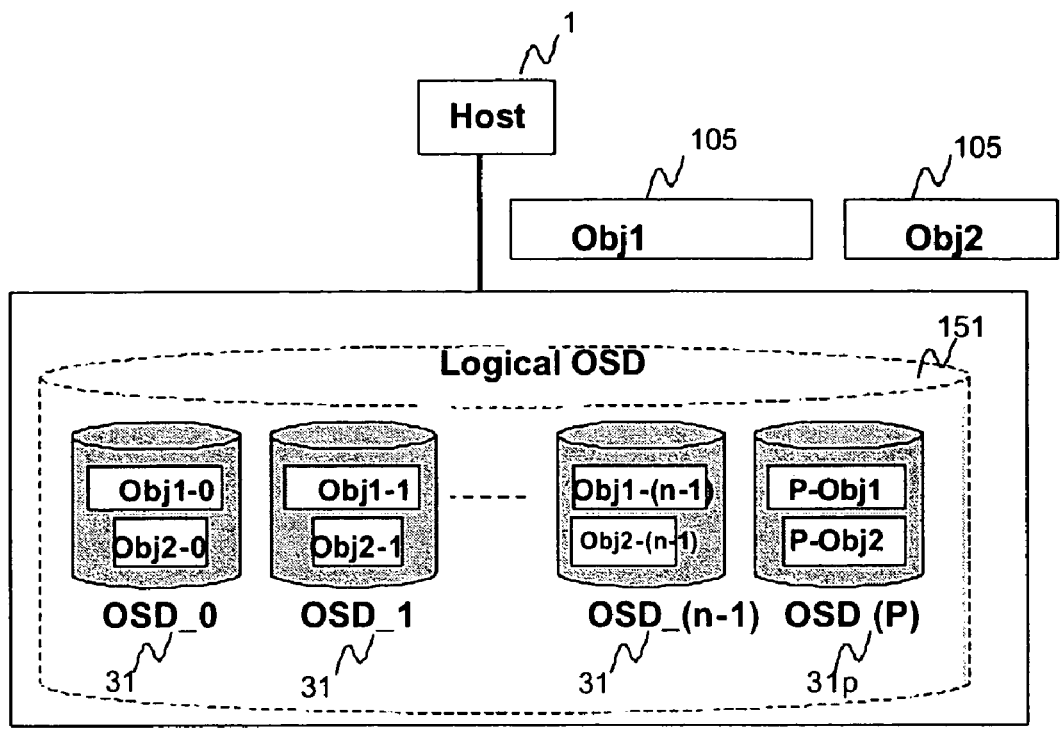
FIG. 4 illustrates an overview of the Redundant Array architecture in the storage system of FIG. 1.
FIG. 5 illustrates logical OSD management table of the invention.

Redundant Arrays Composed of a Plurality of OSDs:

FIG. 4 shows an overview of the Redundant Array architecture in the storage system in FIG. 1. Also, as mentioned above, the storage devices 31 in the storage system 2 receive requests from the disk controller 20 in accordance with the OSD commands. That is, the storage devices 31 store the object 105, including attribute information and data.

FIG. 4 shows how the objects written from host computer 1 are stored into the storage devices 31. The storage system 2 creates one or more logical Object-Based storage devices (logical OSDs) 151, each of which includes a plurality of storage devices 31, respectively. In the present embodiment, each logical OSD 151 has N data storage devices 31, and a parity storage device 31p. When the host computer 1 writes objects 105 (for example, object 1) to the storage system 2, the storage system 2 divides the object into N portions (e.g., obj1-0, obj1-1, obj1-2, . . . obj1-(N−1)), and calculates the XOR value (parity: P-obj1) from the N of the divided objects. The divided data objects are written into the N of the data storage devices 31, and the calculated parity is written into the parity storage device 31p.

Hereinafter in the present embodiment, the objects that are transmitted between the host computer 1 and the storage system 2 are referred to as "logical objects", the objects that the disk controller 20 writes to/reads from each of the data storage devices 31 are referred to as "physical objects", and the objects that are written to/read from the parity storage devices 31p are referred to as "parity objects". Also, in the present embodiment, when a logical object having an object ID=x is written to the storage system 2, the object having the same object ID (object ID=x) as the logical object is assigned to each of the physical objects.

Logical OSD Management:

FIG. 5 shows the logical OSD management table 150. Based on the logical OSD management table 150, the storage system 2 constructs a RAID configuration of each logical OSD. The logical OSD management table 150 is stored in the memory 22. Physical OSD 152 shows which storage devices are used to construct the corresponding logical OSD indicated in the element "Logical OSD 151". RAID level 153 shows the RAID level of the logical OSD. As described above, the object written from host computer 1 is divided into a plurality of physical objects. Stripe size 154 indicates the size of each physical object but does not include the size of physical attribute of each physical object. Details of the physical attribute will be described later.

Attribute size 155 shows the size of attribute of each object in the Logical OSD. In the present embodiment, the size of the attribute is a fixed value within each logical OSD. However, users can define or change the format of the attribute in each logical OSD. If users change the format, the size is automatically calculated by the disk controller 20. (In another implementation, the attribute size may be variable length, but for simplicity of explanation, it is assumed that the attribute size is a fixed value in the present embodiment.) Users of the storage system 2 can create a logical OSD by inputting the above information from console 5. Also, users can define the format of the attribute from console 5.

In the present embodiment, as well as in all embodiments, the storage system 2 can support RAIDs 1-6. However, in the embodiment shown, RAID 1, 3, 4, and 5 are shown to be supported. Since the difference between RAID3 and RAID4 is that the stripe size in RAID 3 is 1 byte and that the one of RAID 4 is more than 1 byte, the stripe size 154 of the logical OSD is determined to be 1 byte when users specify the RAID level 153 as RAID 3.

Attribute Arrangement:

Each logical object has its own attribute (metadata) in addition to data, both of which are stored in the storage devices. In the present embodiment, in a manner similar to the data, the attribute is divided into a plurality of portions by the stripe size, and each of the divided portions is stored into the data storage devices as the data part 164 of the physical objects.

FIG. 6A-6C show how an object is stored in the storage devices 31. Also, parity is calculated and the resultant parity data is stored into parity storage device 31p. If the attribute does not fit the multiples of the stripe size, null data is inserted to the last data block, except in the case of a RAID1 architecture. For example, in the logical OSD management table 150 in FIG. 5, the stripe size of logical OSD number 1 is 256 KB and the attribute size is 10 KB. In this case, since the attribute occupies only 10 KB of area in the physical data block, 246 KB of null data is added after the attribute in the block.

Physical Attribute:

When the physical object 160 is created in the data storage device, its attribute is also created. In the present embodiment, it is referred to as "physical attribute" 161. The physical attribute 161 includes the similar attribute value as the attribute 171 of the logical object 170, but does not need to include the same attribute value in every attribute. When the physical object 160 is created, at least the User_Object_ID 162 and Partition_ID 163 in the physical attribute 161 are set to the same identification numbers as the logical object 170. By doing this, disk controller 20 can only access the physical object 160 having the same object ID 162 as that of the logical object 170. As for other attributes, the same values may be set, or different values may be set.

Figure 7:
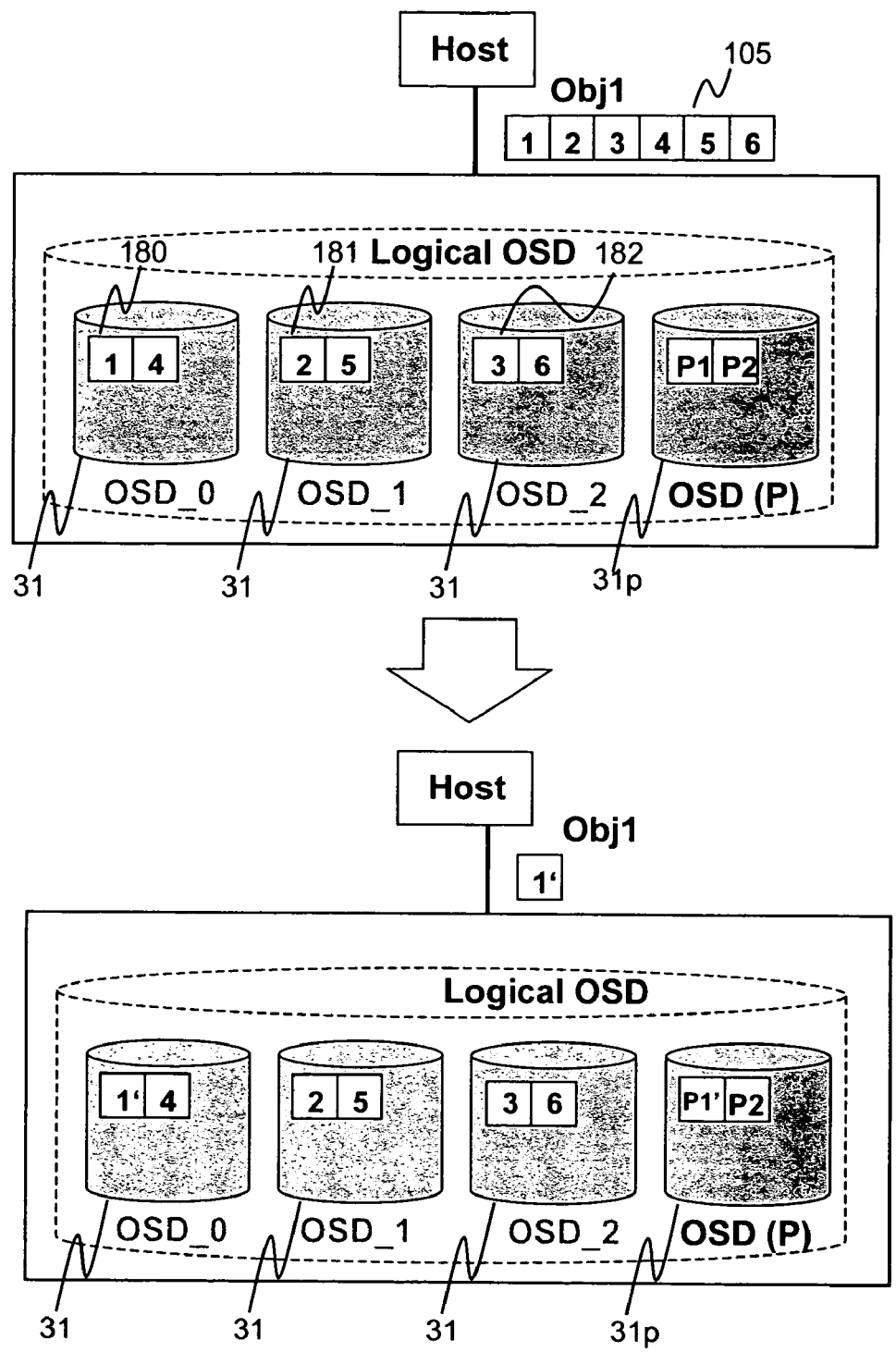
FIG. 7 illustrates how the parity object is generated from a plurality of physical objects in the present invention.

Parity Generation:

FIG. 7 shows how the parity object is generated from a plurality of physical objects in the present embodiment. In FIG. 7, the number of data storage devices is three (that is, N=3), and the stripe size is 1 KB. When the host computer 1 issues a write request with an object 105 (OBJ1) whose object size is 6 KB (for ease of understanding, suppose that each of the boxes 1, 2, 3, . . . and 6 represents 1 KB size of data blocks, and an object is composed of the six blocks), the disk controller 20 first divides the object 105 into six fixed length blocks equally (1 KB in each block), then stores each block to the data storage devices 31 (OSD_0, OSD_1, and OSD_2) respectively. In this example, since there are three data storage devices 31 and the number of blocks is greater than three, the fourth and subsequent data blocks are stored in the data storage devices 31 beginning with OSD_0. That is, 1 and 4 are stored to OSD_0 as the first object 180, 2 and 5 are stored to OSD_1 as the second object 181, and 3 and 6 are stored to OSD_2 as the third object 182. Also, a parity object is calculated by Parity (p1)="block 1" XOR "block 2" XOR "block 3"

Parity (p2)="block 4" XOR "block 5" XOR "block 6"

Second, when the data 1 of object 105 is updated into data 1', parity p1 should also be recalculated. In this case, the parity p1' is calculated by the following formula:

Parity (p1')="block 1" XOR "block 1'" XOR "block p1"

This is a similar method to the prior RAID system using the block access based storage device (such as SCSI HDD). The parity objects are stored in parity storage device 31p.

Figure 8:
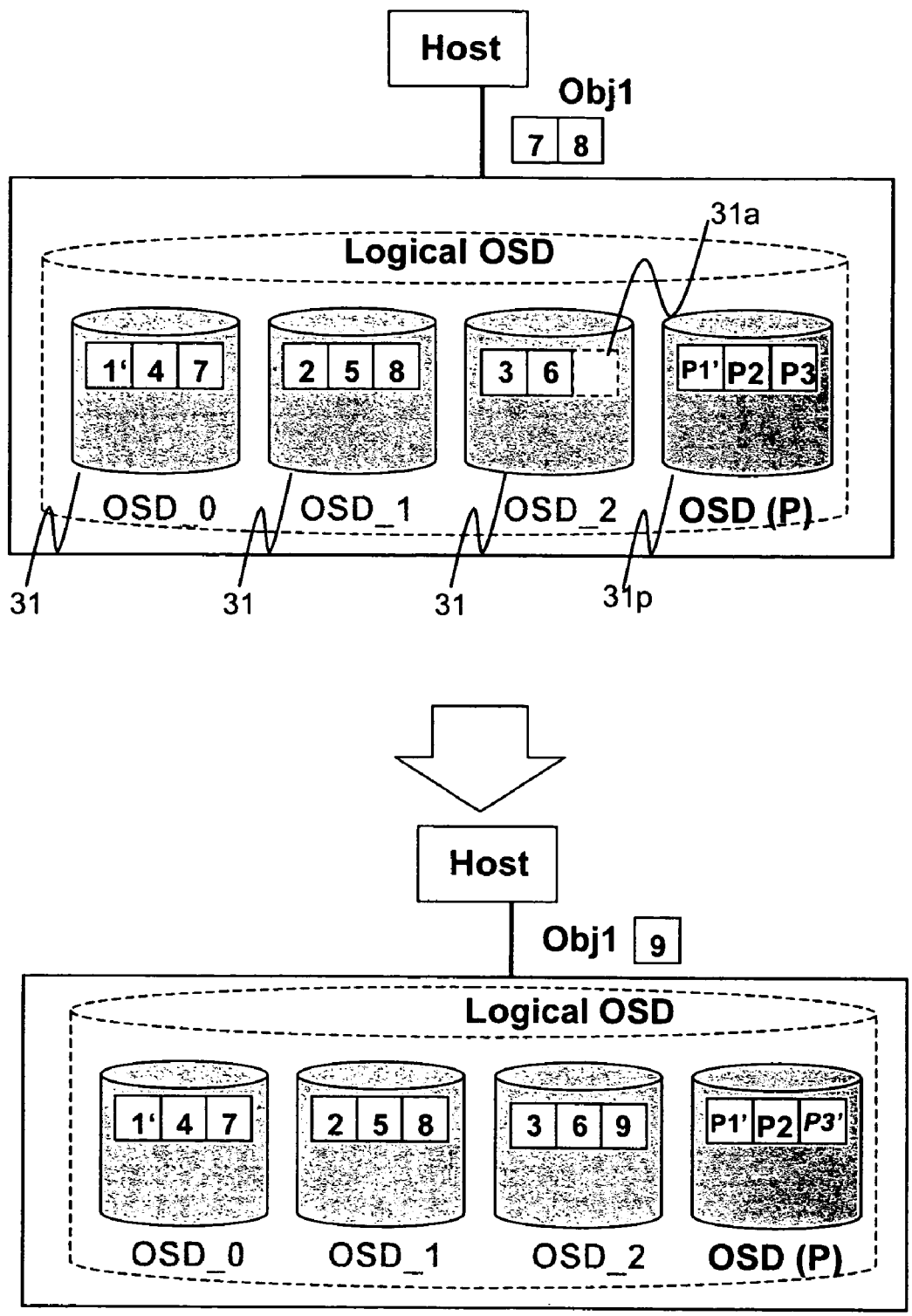
FIG. 8 illustrates parity object updating for data updates in the storage devices of the invention.

Thereafter, in FIG. 8, if the data 7 and 8 are appended to the object 1, the data 7 and 8 are appended to each of the data storage devices 31, respectively, and the parity p3 corresponding to the data 7 and 8 is calculated by XORing data 7 and 8. In the prior RAID technology using the block access based storage device (such as SCSI HDD), when calculating parity, it was necessary to read the unused area 31a where the data had not been written (the box written in the dotted line) and then calculate parity by XORing data 7, 8 and the unused area 31a. In the present embodiment using OSD, it is not necessary to read the unused area 31a.

Further, if the data 9 is appended to the object 1, data 9 is appended to OSD_2, and the parity p3 is recalculated into p3' by the following calculation:

Parity (p3')="parity p3" XOR "block 9"

In the above embodiment, the parity generation is explained based on the assumption that the multiples of 1 KB data is updated/appended. But this method is applicable when less than 1 KB data is updated/appended. For example, when data 1 is to be updated to data 1', suppose that only the first 100 bytes of data is updated. In this case, the disk controller 20 reads the first 100 bytes of parity data from parity p1, calculates a new parity by XORing 100 bytes of data 1 and 100 bytes of parity p1, and then stores 100 bytes of new data 1' and 100 bytes of new parity p1' into the data storage device 31 and parity storage device 31p, respectively.

Process Flow of I/O Operations:

The major operations/commands in OSD are set forth as follows. The CREATE command is used to allocate one or more objects in the OSD. The WRITE command is used for writing a certain length of data from the specified starting byte address in the object specified with the object ID. The key parameters of the WRITE command are the object ID, starting byte address, and length. Also, the attribute can be changed at the same time when invoking the command. The READ command is used for reading a certain length of data from the specified starting byte address in the object specified with the object ID. The key parameters of the READ command are the object ID, starting byte address, and length. Also, the attribute can be changed at the same time when invoking the command. The CREATE-and-WRITE command is used to execute the CREATE operation and the WRITE operation in a single command. Finally, the APPEND command is used to append the specified length of data after the current object.

Figure 9:
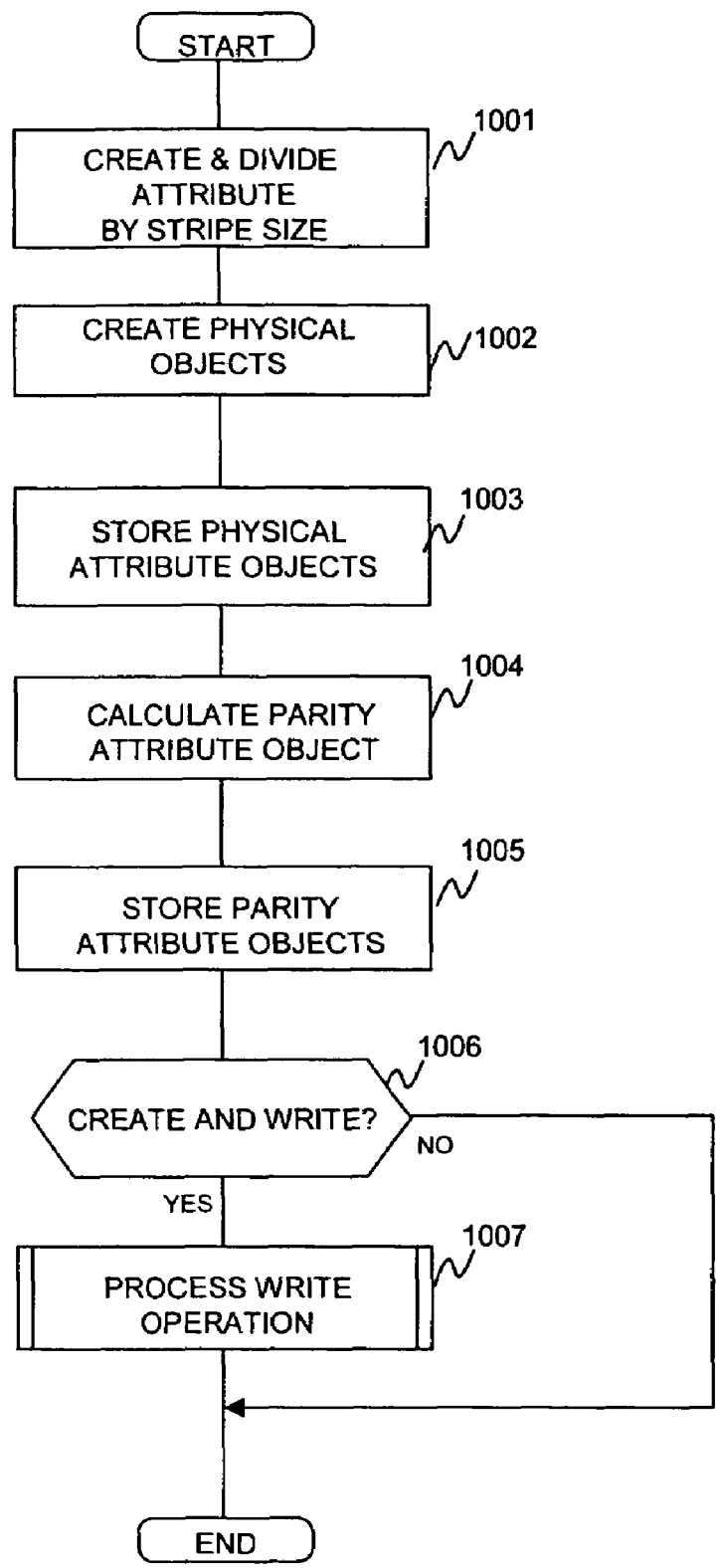
FIG. 9 illustrates the process flow when the storage system receives a CREATE (or CREATE-AND-WRITE) command from the host computer.

FIG. 9 shows the process flow when the storage system 2 receives a CREATE (or CREATE-AND-WRITE) command from the host computer 1. The process is executed in the CPU 21.

Step 1001: Attribute information is created based on the parameters included in the CREATE command. Then, the attribute information is divided by the stripe size. If the size of the attribute is 10 KB and the stripe size is 1 KB, the attribute information is divided into 10 portions.

Step 1002: Physical objects are created from the divided portions. The physical attribute information is added to each divided portion. Hereinafter, the portion in which the physical attribute information is added is referred to as "physical attribute object".

Step 1003: Each physical attribute object is stored into each of the storage devices by issuing a "CREATE-AND-WRITE" command to each of the storage devices.

Step 1004: Parity information is calculated from the divided portions which are produced at step 1002. Then, the object is created by adding the physical attribute information to the parity information. The physical attribute information attached to the parity information is the same as that added to the divided portions at step 1002. The produced object is referred to as a "physical parity attribute object".

Step 1005: The physical parity attribute objects are stored in the storage device.

Step 1006: It is determined whether the command received from the host computer is a "CREATE-AND-WRITE" command or a "CREATE" command. If it is the "CREATE-AND-WRITE" command, the process proceeds to step 1007. If not, the process terminates.

Step 1007: The write operation is performed.

A description of the write operation is provided below.

Figure 10:
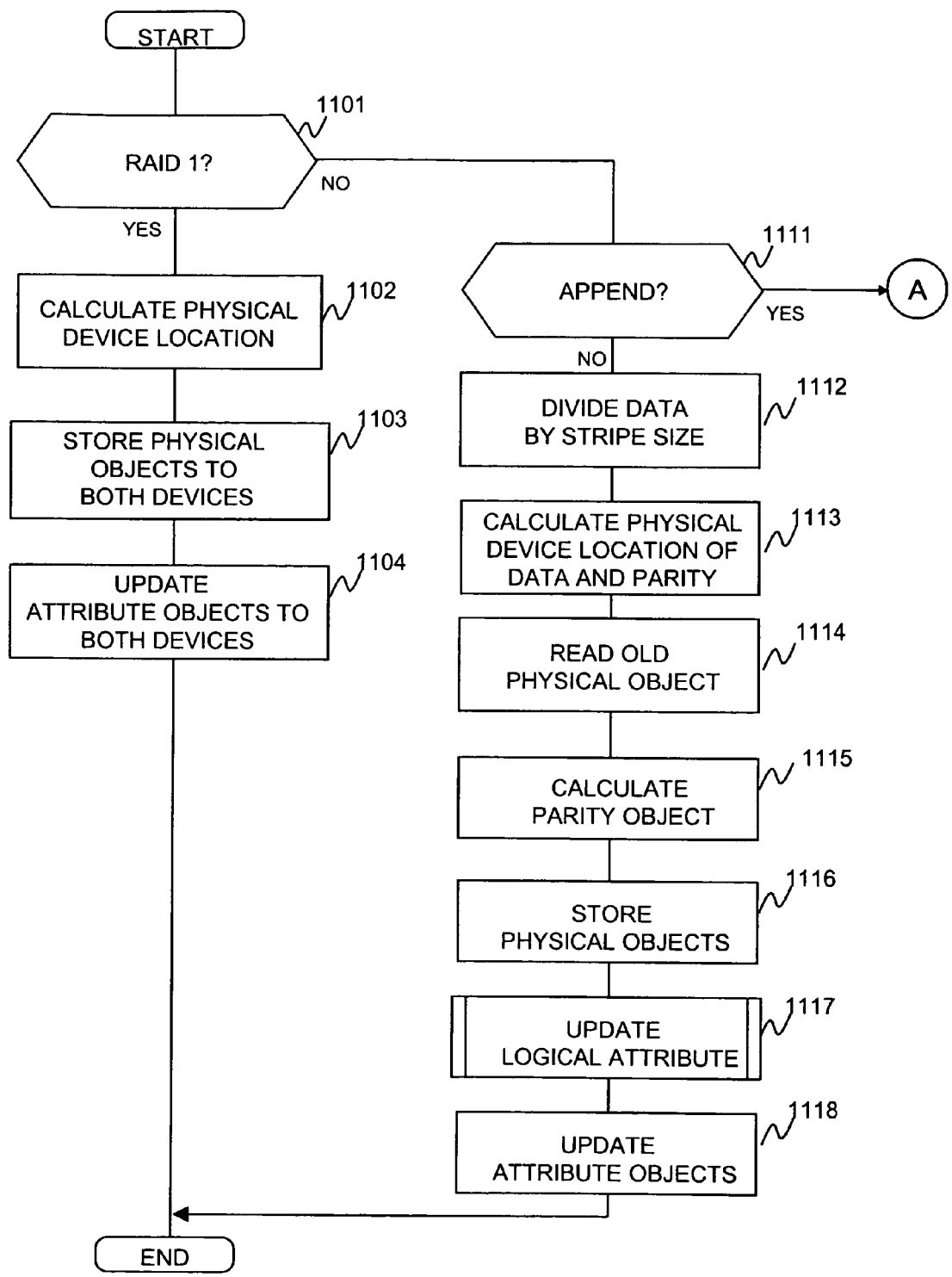
FIG. 10 illustrates the process flow when the storage system receives a WRITE, CREATE-AND-WRITE, OR APPEND command from the host computer.
Figure 11:
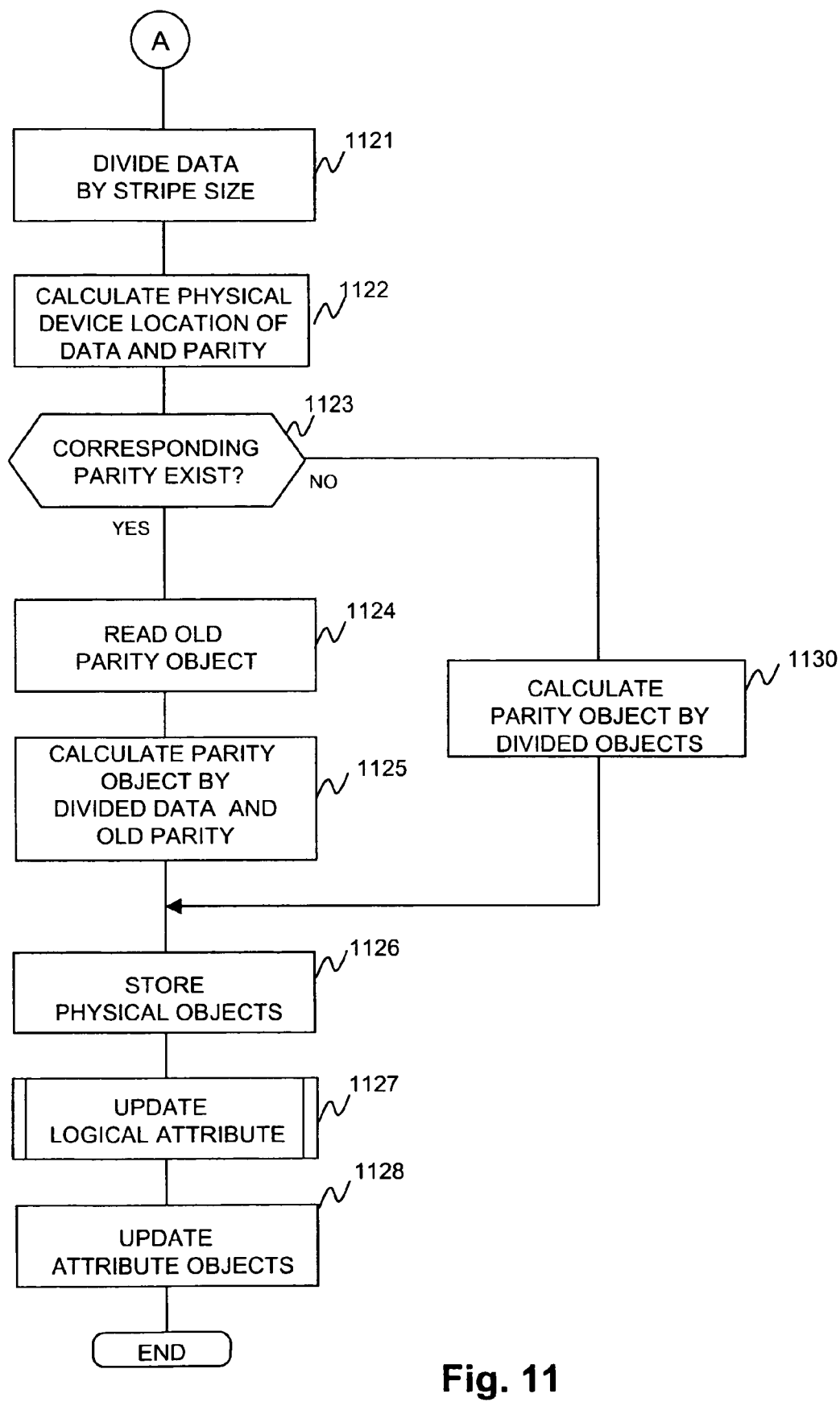
FIG. 11 illustrates a continuation of the process flow of FIG. 10 if an APPEND command has been received.

FIGS. 10 and 11 show the process flow of the write operation when the storage system 2 receives a WRITE, CREATE-AND-WRITE, or APPEND command from the host computer 1. The process is also used in step 1007 in FIG. 9. The process is executed in the CPU 21.

Step 1101: It is determined whether or not the logical OSD is a RAID1. If it is RAID 1, the process proceeds to step 1103. If it is not (it means that the logical OSD is RAID 3, 4, 5, or 6), the process proceeds to step 1111.

Step 1102: Based on the logical OSD management table, the storage devices to which data is to be written are specified as well as the locations where the data is to be written. In the RAID 1 architecture, the first byte address of the data area is located just after the attribute of the logical object. Therefore, the offset is determined by the following calculation:

Offset=starting byte address in the WRITE command+Attribute Size

Step 1103: Based on the calculated device location (in step 1102), the object is stored into two storage devices (since the logical OSD is RAID1, data is mirrored in two storage devices).

Step 1104: The physical attribute of the two storage devices are updated. For example, the object size or data modified time attributes are updated.

Step 1111: It is determined whether the command instructs to append data or update data ("Append" means that the object size is expanded and that new data is added after the current object and is realized by issuing APPEND command or WRITE command). If an append operation is instructed, the process proceeds to step 1121, if an update operation is instructed, the process proceeds to step 1112.

Step 1112: The write data from host computer 1 is divided into a plurality of portions by the stripe size.

Step 1113: Based on the logical OSD management table, the storage devices to which data is to be written are specified, as well as the locations where the data is to be written. The locations are specified by the byte offset in the object. For example, in the case of a RAID 4 architecture whose data storage devices are OSD_0, OSD_1 and OSD_2, the data storage device (OSD_X) to which the data is to be written and the offset address of the physical object (offset) are determined by the following calculations:

$$OSD\_X = \mod\left(\frac{\left\lceil\frac{AttributeSize}{StripeSize}\right\rceil + startingAddr.}{numberofDataStorageDevice}\right)$$

$$offset = \left\lfloor\frac{\left\lceil\frac{AttributeSize}{StripeSize}\right\rceil + startingAddr.}{numberofDataStorageDevice}\right\rfloor$$

($\lceil \cdot \rceil$ indicates that the value is rounded up to the nearest integer value, and $\lfloor \cdot \rfloor$ indicates that the value is rounded down to the nearest integer value.)

Figure 12:
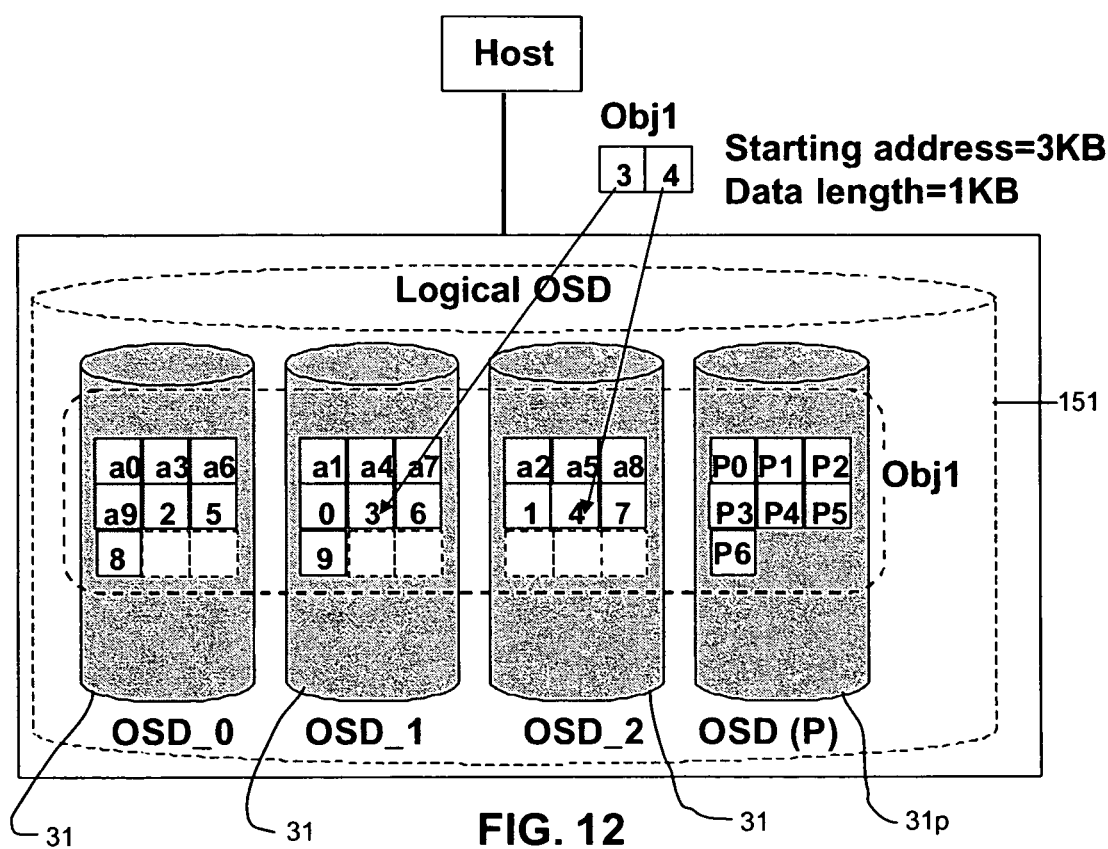
FIG. 12 illustrates a WRITE command for writing data to logical OSD ID=0 wherein it is determined that the target data storage device is OSD_1 and offset is 4 KB.

Supposing that the host computer 1 issues a WRITE command to instruct to write data to logical OSD ID=0 that is defined in the logical OSD management table 150 (it consist of a set of storage devices constructing RAID4 architecture), the starting byte address=3 KB, and the data length=1 KB. According to the logical OSD management table 150, AttributeSize is 10 KB, StripeSize is 1 KB, and the NumberofDataStorageDevice is 3 (since the logical OSD 0 is composed of four physical OSDs and one of the physical OSD is used for storing parity (because of RAID4)). Based on the above formula, it is determined that the target data storage device is OSD_1 and offset is 4 KB. (See FIG. 12.) Also, the offset of the parity can be specified by using the similar calculation.

In other RAID levels, the data storage device and offset are also calculated similarly.

Step 1114: Old data is read from the offset address in the data storage device that is designated at step 1101. Also, old parity information is read from the parity storage device associated with the data storage device.

Step 1115: Based on the divided data in step 1112, old data, and old parity, the new parity value is calculated.

Step 1116: The divided write data and new parity value are stored into the storage devices.

Step 1117: The logical attribute is updated. Details for updating the logical attribute is described later.

Step 1118: Similar to step 1104, physical attribute of the storage devices is updated. Since the size of the physical objects (including physical parity object) is not changed in the update operation, the object size attribute is not changed. In another implementations, physical attribute is not necessarily updated since the updated information is in logical attribute.

Now, FIG. 11 will be described following Step 1111 in FIG. 11, where it is decided that an append operation is being performed.

Step 1121: Same as step 1112.

Step 1122: same as step 1113.

Step 1123: It is determined whether parity exists in the parity storage device associated with the write data. If parity exists, the process proceeds to step 1124. If not, it proceeds to step 1130.

Step 1124: The old parity is read.

Step 1125: The new parity is calculated by XORing the divided data and the old parity read in step 1124.

Step 1126: The physical object (the divided data and the calculated parity) is stored into the data and parity storage devices.

Step 1127: Same as step 1117, the logical attribute is updated.

Step 1128: same as step 1118.

Step 1130: In this case, since the parity has not been calculated before, the parity can be calculated by the divided data only. The parity is calculated by XORing the divided data.

Figure 13:
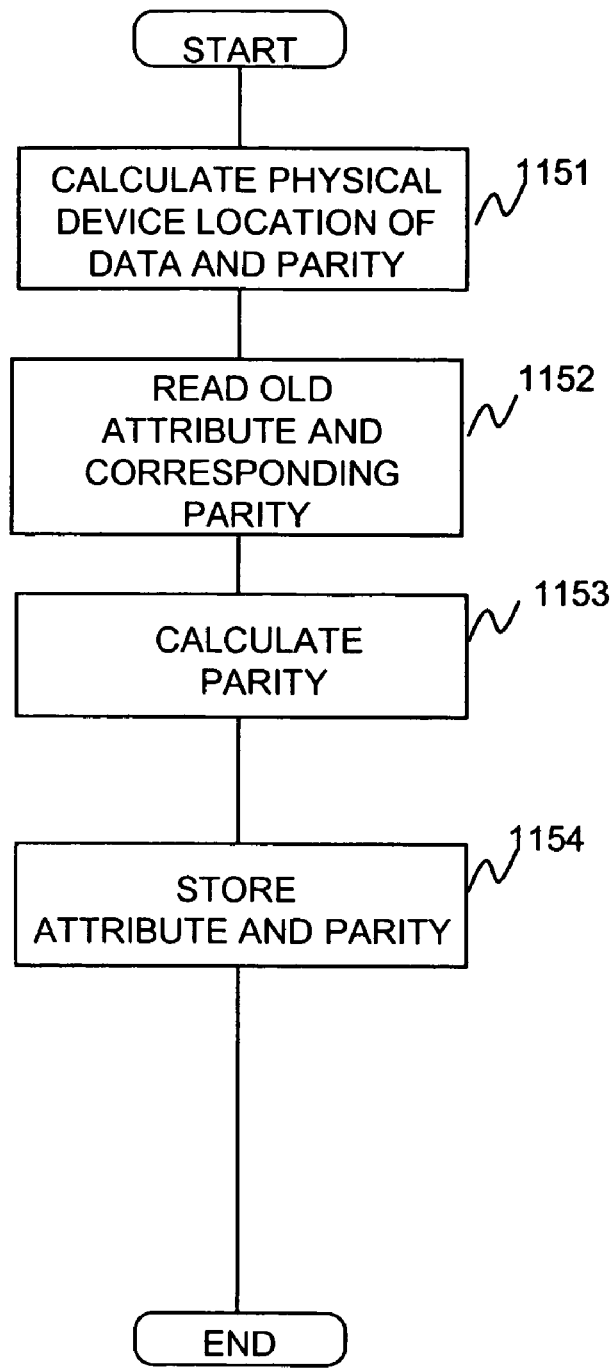
FIG. 13 illustrates the process flow of updating the attribute of the logical object.

FIG. 13 shows the process flow of updating the attribute of the logical object. This process corresponds to steps 1117 or 1127 in FIG. 10 or 11, respectively. Since the attribute is stored in the data storage devices as part of the physical object, the process is almost the same that in FIG. 10.

Step 1151: same as 1113.

Step 1152: The attribute value to be updated is read from the data storage device, and the corresponding parity data is read from the parity storage device. For example, when the data is updated, the data modified time attribute value should be changed. Therefore, data modified time attribute and the corresponding parity data is read.

Step 1153: The new parity is calculated from the new attribute value and the old data and parity that were read at step 1152.

Step 1154: The new attribute value and the corresponding new parity are stored in the data storage device and the parity storage device respectively.

Figure 14:
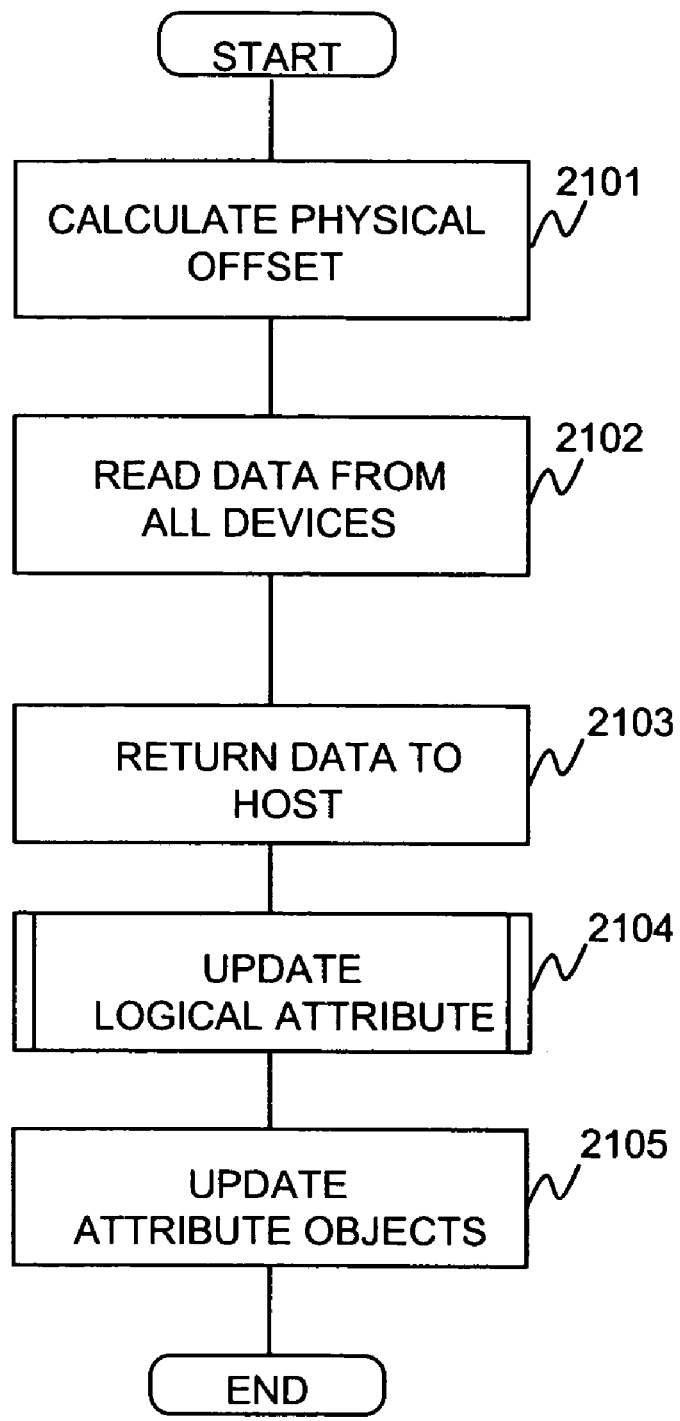
FIG. 14 illustrates the process flow when the host computer issues the READ or GET ATTRIBUTE command to the storage system of the invention.

FIG. 14 shows the process flow when the host computer 1 issues the READ or GET ATTRIBUTE command to the storage system 2.

Step 2101: Based on the logical OSD management table, which location in which storage devices the data is to be written is calculated. It is the same as step 1113.

Step 2102: Data from the calculated locations that is determined in step 2101 are read. If the data to be read is spread in a plurality of storage devices, data from all storage devices is read. The read data is stored in the cache memory and concatenated into an appropriate order.

Step 2103: The concatenated data is returned to the host computer 1.

Step 2104: The logical attribute is updated. This is same as step 1117.

Step 2105: Similar to step 1118. In step 2105, the accessed time attribute is changed.

Further, when a logical object is deleted, for example, the storage system 2 receives a REMOVE command, and the physical objects having the same partition ID and object ID as the logical object are then deleted from the physical OSDs.

2nd Embodiment

Figures 15, 16:
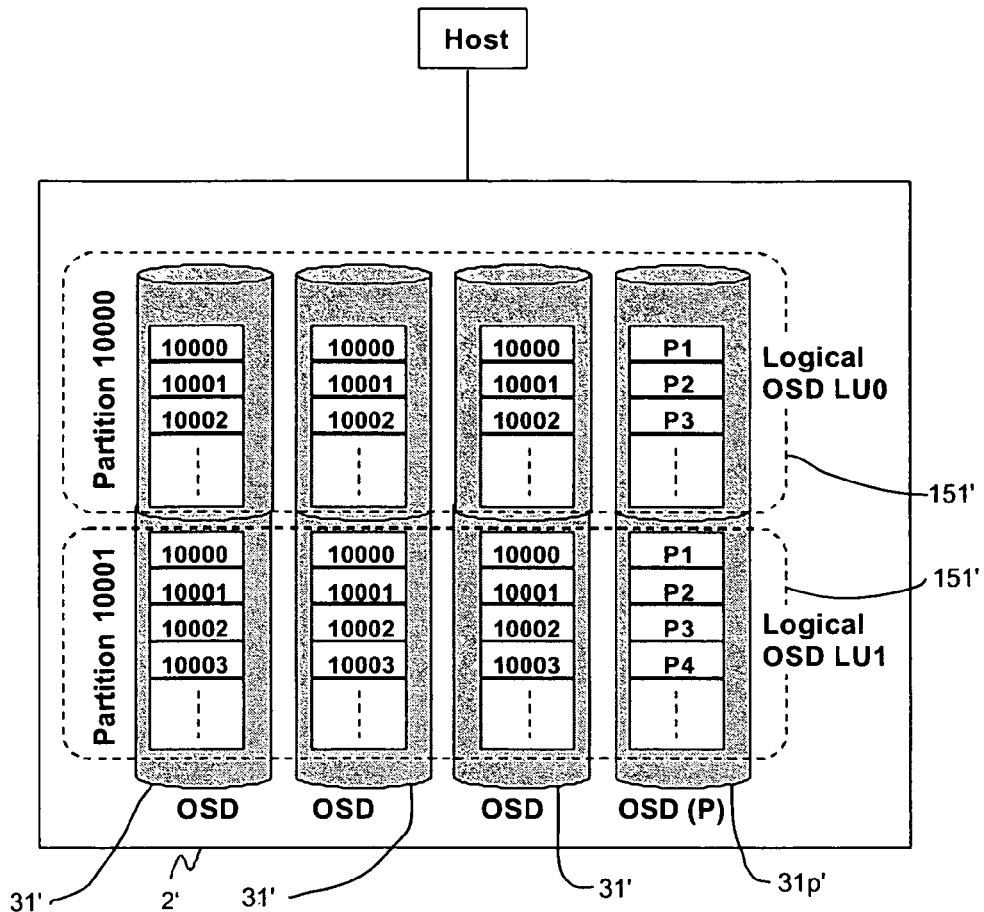
FIG. 15 illustrates an overview of the Redundant Array architecture of a second embodiment of the invention.
FIG. 16 illustrates a logical OSD management table of the second embodiment of the invention.

The architecture of the storage system 2' in the second embodiment is the same as the one of the first embodiment. FIG. 15 shows an overview of the Redundant Array architecture in the second embodiment. In FIG. 15, OSD_0, OSD_1, OSD_2, and OSD_3 (e.g. physical OSDs) construct a RAID 4 architecture. The set of the physical OSDs is called a "RAID group". In the present embodiment, one or more logical OSDs 151' are defined in the RAID group. Each physical OSD 31' includes one or more partitions and a logical OSD 31' is constructed from a plurality of partitions having the same partition ID. In each physical OSD, a plurality of objects (e.g., physical objects) is created, and a logical object is constructed from a plurality of physical objects.

FIG. 16 shows the logical OSD management table 150'. This table 150' maintains the construction of each Logical OSD 151'. Physical OSD 152' is the same as the Physical OSD 152 in the 1st embodiment. RAID level 153' is the same as the RAID level 153. Stripe size 154' is similar to the Stripe size 154. The storage system 2' creates objects in each physical OSD that is defined in the physical OSD 152', and each physical object size is determined in accordance with the stripe size 154'. It means that the every physical object size is equal to the stripe size 154'. Attribute size 155' is the same as the Attribute size 155. Partition ID 156' shows the partition ID of the physical OSD 152' (physical partition) that is used for constructing the logical OSD 151'. OSD size 157' shows the size of the logical OSD 151'. Further, you can calculate the size of the physical partition of each physical OSD. Since the size of logical OSD 0 is 300 GB and the logical OSD is constructed from four physical OSD (and one OSD is parity device), the size of each physical partition is 100 GB.

FIG. 17 shows the logical object management table 500. It maintains the relation between the logical object and the physical objects. It is stored in the memory 22. Or in another embodiment, it may be stored in the storage devices 31. Partition ID 501 is the partition ID of the logical object. Object ID 502 is the user object ID of the logical object. [Physical OSD, physical object] 503 shows from which physical objects each logical object is constructed.

Process Flow of I/O Operations:

The process flow of read/write operations is almost the same as in the 1st embodiment. The points that differ from the 1st embodiment are explained below.

In the 2nd embodiment, when the append operation is executed, in step 1125 in FIG. 11, before storing data, a new object is created in the data storage device. If the object for storing parity does not exist, a new object is also created in the parity storage device. At the same time when the physical objects are created, the information about the physical objects is stored into the logical object management table 500. Further, when the logical object is deleted in the logical OSD by a REMOVE command, the physical object associated with the logical object is deleted and the entry in the logical object management table 500 is also deleted.

3rd Embodiment

In the above embodiment, the stripe size is equal within each logical OSD, but in an alternative method of implementation, stripe size may be different in each logical object. When the logical object is read or written, it is desirable that every data storage device operates from the perspective of performance. Therefore, in the third embodiment, the disk controller 20 can change the stripe size in accordance with the logical object size.

For example, a logical OSD is defined comprising three data storage devices (and one parity storage device), and host computer tries to write 300 KB of logical object. To make all storage devices work, the object should be divided into three physical objects.

In the 3rd embodiment, instead of the logical OSD management table 150', the logical OSD management table 150" is used (FIG. 18). The logical OSD management table 150" does not include stripe size 154' field. The corresponding stripe size information is kept in each physical object in the data storage devices and the parity storage devices.

Figure 19:
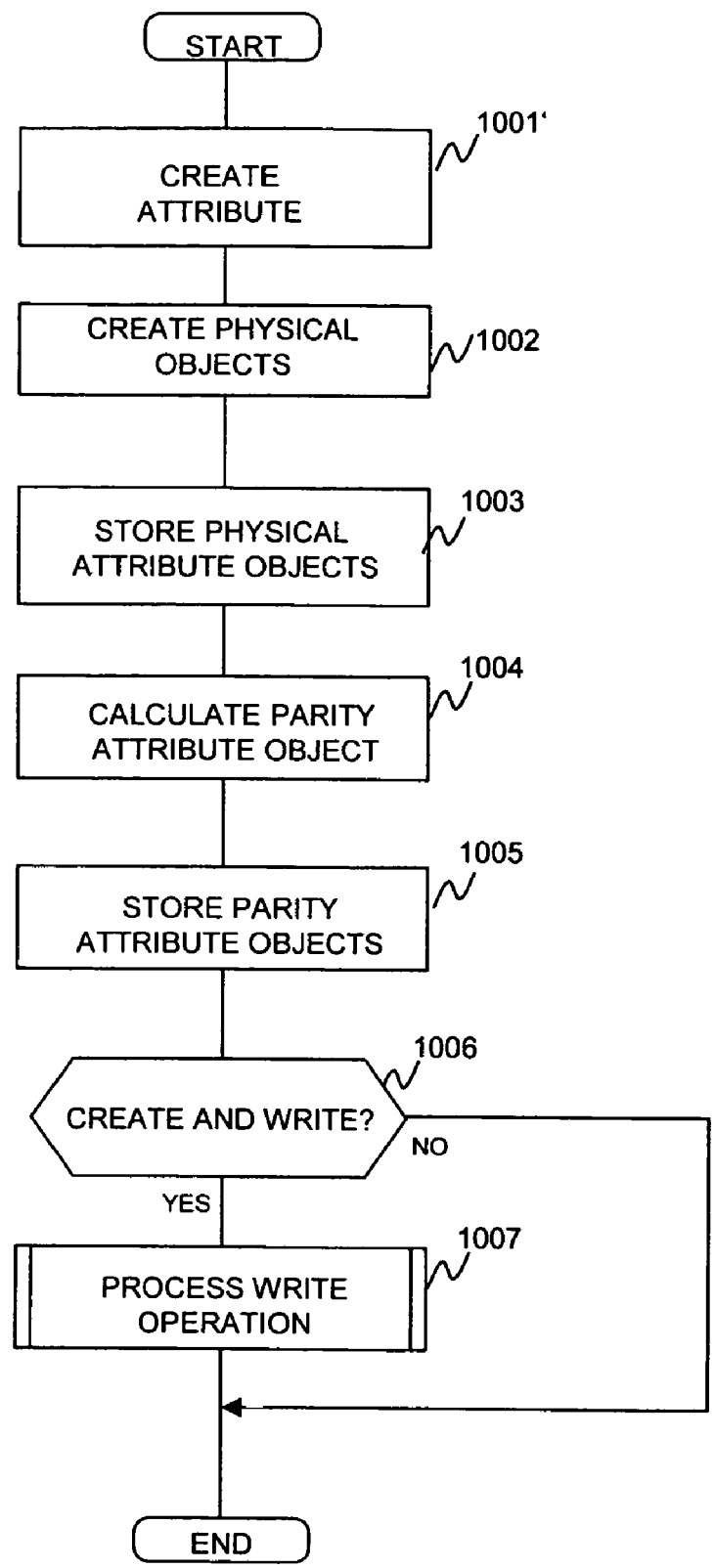
FIG. 19 illustrates the process flow when the storage system receives a CREATE (or CREATE-AND-WRITE) command from the host computer under the third embodiment of the invention.

Process Flow of I/O Operations:

FIG. 19 shows the process flow when the storage system 2' receives a CREATE (or CREATE-AND-WRITE) command from the host computer 1. The difference from the 1st or 2nd embodiment is that the step 1001 is replaced with step 1001'.

In step 1001', the attribute of the logical object is created, but is not divided into data stripes. Then the attribute is first written to one of the data storage devices (usually, it is the first data storage device that is in the element 152' in the logical OSD management table 150").

Figure 20:
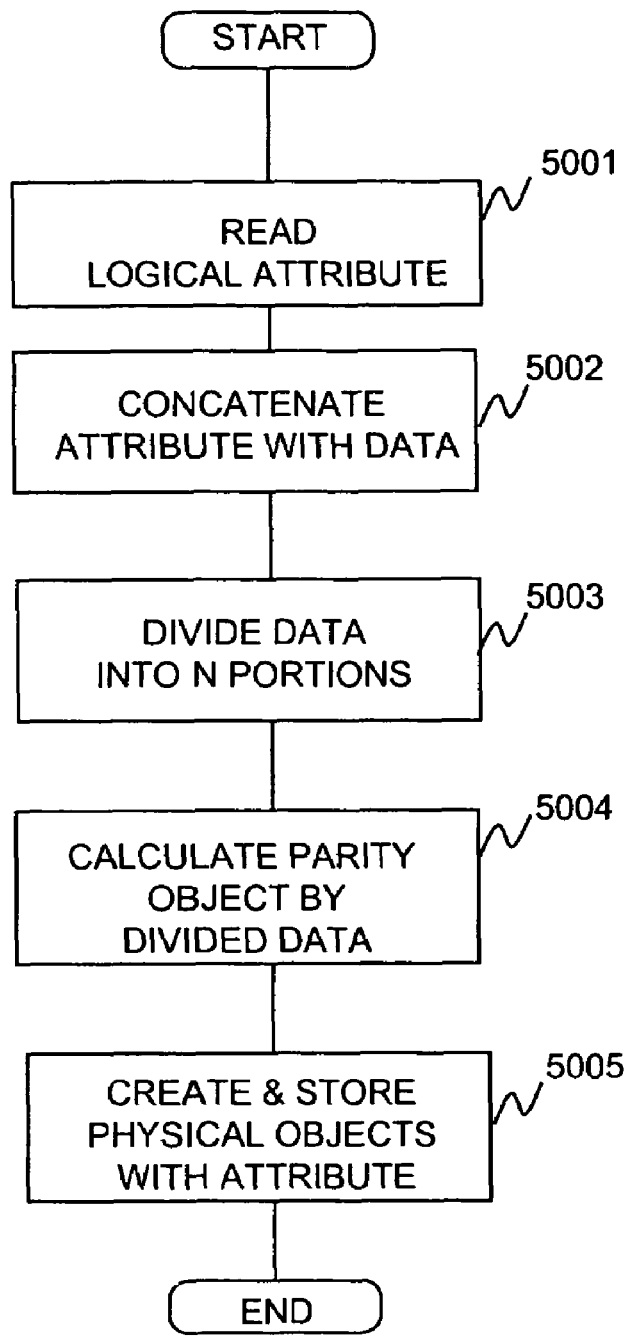
FIG. 20 illustrates the process flow when data is first written to a target object from the host computer (e.g., when a CREATE-AND-WRITE command is issued, or a first WRITE command is issued).

FIG. 20 shows the process flow when data is first written to the target object from the host computer 1 (it is when the CREATE-AND-WRITE command is issued, or a first WRITE command is issued). In the 3rd embodiment, the stripe size of the object is determined when the data is first written to the target object, based on the data size of the WRITE (or CREATE-AND-WRITE) command.

Step 5001: The attribute is read once.

Step 5002: The attribute is concatenated with the write data. The data that is generated in the step is called "concatenated data".

Step 5003: Based on the concatenated data in step 5002, the stripe size is determined and the data is divided by the stripe size. The stripe size is calculated by:

"concatenated data size/number of data storage device"

For example, if the concatenated data size is 90 KB and the number of data storage devices is 3, the stripe size is determined to be 30 KB.

Step 5004: The parity is calculated by XORing all of the divided data.

Step 5005: The physical objects are created in all data and parity storage devices and all data and parity are stored by using CREATE-AND-WRITE command. The object size is determined to be the size that was calculated in step 5003. At the same time, the physical attribute is stored. The major attribute in the physical object is the used capacity attribute.

While specific embodiments have been illustrated and described in this specification in sufficient detail to enable those skilled in the art to practice the invention, those of ordinary skill in the art appreciate that any arrangement that is calculated to achieve the same purpose may be substituted for the specific embodiments disclosed. Other embodiments may be utilized and derived therefrom, such that structural and logical substitutions and changes may be made without departing from the scope of the invention. This disclosure is intended to cover any and all adaptations or variations of the present invention, and it is to be understood that the above description has been made in an illustrative fashion, and not a restrictive one. Combinations of the above embodiments, and other embodiments not specifically described herein will be apparent to those of skill in the art upon reviewing the foregoing disclosure. Thus, the scope of the invention should properly be determined with reference to the appended claims, along with the full range of equivalents to which such claims are entitled.

What is claimed is:

1. A storage system comprising:
   a plurality of object-based storage devices (OSDs), each storing one or more objects in an object-based format, such that each object includes data and attribute information for the data; and
   a logical object-based storage device, the logical object-based storage device created to include the plurality of OSDs,
   wherein, when a first object having first data and first attribute information is stored to said logical object-based storage device in said object-based format as a logical object, the first object is divided into plural sub-objects by dividing the first data and the first attribute information into plural data portions,
   wherein, for each sub-object, the plural data portions to be stored in each OSD are stored into each OSD by combining the plural data portions to be stored in that OSD to create a data part of the sub-object for storage in that particular OSD,
   wherein each OSD creates and stores second attribute information for said data part of said sub-object to be stored into that particular OSD, and each OSD stores the data part of the sub-object with said second attribute information created by that OSD in said object-based format.

2. The storage system according to claim 1
   wherein the first object includes a first object ID,
   wherein the sub-objects each include a second object ID, and
   wherein the first object ID of the first object is the same as the second object IDs for the sub-objects.

3. The storage system according to claim 1,
   wherein the OSDs are each partitioned into plural partitions to create a plurality of logical partitions, each said partition having a partition ID and encompassing a portion of each of the plurality of OSDs, whereby a particular logical partition is able to be treated as a logical object-based storage device.

4. The storage system according to claim 1,
   wherein data is stored to said OSDs according to a specified stripe size;
   wherein the stripe size for the plurality of OSDs is determined from a size of the first object.

5. The storage system according to claim 4,
   wherein the stripe size is determined by concatenating the first data with the first attribute information to create a concatenated data, and dividing a size of the concatenated data by a quantity of the OSDs to which the first object is to be stored as sub-objects.

6. The storage system according to claim 1,
   wherein parity information is calculated for the data portions to create a plurality of parity portions, and
   wherein when the first object is updated, a corresponding data portion is updated within a corresponding sub-object, and the parity information for the corresponding data portion is also updated.

7. The storage system according to claim 1,
   wherein parity information is calculated for the data portions to create a plurality of parity portions,
   wherein when data is appended to the first object as appended data, the appended data is divided according to a predetermined stripe size to create second appended data portions, and the OSDs designated for storing the second appended data portions add said second appended data portions to their data part of their sub-object, and create and store new second attribute information to create one or more appended sub-objects, and
   wherein new parity information is calculated for the appended data portions using an XOR function.

8. The storage system according to claim 7,
   wherein said OSDs are configured for storing said sub-objects in stripes of a specified size, and wherein when an amount of the appended data is such that a first one of the plurality of said OSDs does not include a second appended data portion in a particular stripe containing a second appended data portion in another of said OSDs, the new parity information is calculated without considering any other data stored in said first OSD of said plurality of OSDs.

9. The storage system according to claim 8,
   wherein when an additional appended data portion is appended to said particular stripe of said first OSD of the plurality of OSDs, another new parity information is calculated by XORing most-recently calculated parity information with the additional appended data portion.

10. The storage system according to claim 1,
    wherein parity information is calculated for the data portions to create a plurality of parity portions, and
    wherein the plurality of OSDs are arranged in a RAID configuration in which the sub-objects are stored to a group of said OSDs in data stripes of a predetermined storage size, while said parity information is stored to a parity OSD separate from said group as a parity object having its own attribute information by storing the plurality of parity portions as the data part of the parity object, wherein the parity OSD creates and stores parity attribute information to the data part of the parity object.

11. A method of storing object-based data to a storage system having a RAID architecture including a plurality of object-based storage devices (OSDs) capable of storing one or more objects in an object-based format, such that each object includes data and attribute information for the data, the method comprising the steps of:

specifying a first object for storage in said storage system, said first object having first attribute information and a first data part;

dividing the first object into a plurality of second objects, such that said first data part and said first attribute information are divided into a plurality of second data portions;

creating a second data part for each second object for each OSD made up of said second data portions designated to be stored in the particular OSD;

creating and storing, by each OSD, second attribute information for each said second data part designated for storage in that particular OSD to create the second object stored in that OSD, whereby one of said second objects is stored in each said OSD.

12. The method according to claim 11, further comprising a step of:
partitioning the plurality of OSDs to create a plurality of logical partitions, each said partition having a partition ID and encompassing a portion of each of the plurality of OSDs, whereby a particular logical partition is treated as a logical object-based storage device.

13. The method according to claim 11, further comprising a step of:
computing parity information for said second data portions to create parity portions;
storing said parity portions to a parity OSD, said parity OSD creating and storing second attribute information for said parity portions to create a parity object;
updating the parity object when any of said second objects is updated.

14. The method according to claim 11, further comprising steps of:
computing parity information for said second data portions to create parity portions;
storing said parity portions to a parity OSD, said parity OSD creating and storing second attribute information for said parity portions to create a parity object;
appending appended data to said first object by dividing the appended data by a predetermined stripe size for said RAID architecture to create second appended data portions;
adding each second appended data portion to the data part of a designated OSD, wherein each designated OSD stores new second attribute information for the data part including the second appended data to create an appended second object stored in each designated OSD; and
calculating new parity information using an XOR function.

15. The method according to claim 14, further comprising a step of:
storing said second objects in said OSD in stripes of a predetermined size; and
when an amount of appended data is such that a first one of the plurality of OSDs does not include an appended second data portion in a particular stripe containing an appended second data portion in another of the OSDs, calculating the new parity information for the particular stripe is performed without considering any other data stored in said first one of the plurality of OSDs.

16. The method according to claim 11, further comprising a step wherein the second objects are stored into the plurality of OSDs before parity information is calculated.

17. The method according to claim 11, further comprising a step of
determining a stripe size for the RAID architecture by concatenating the first attribute information to the first data part to form concatenated data, and dividing a size of the concatenated data by a number of said OSDs to which the second objects are to be stored.

18. In a system having a plurality of object-based storage devices (OSDs) into which data and corresponding attribute information are stored in a dispersed fashion, a method of calculating parity information for the data and attribute information comprising the steps of:
identifying a first object for storage, said first object including first data and corresponding first attribute information;
dividing the first object into a plurality of second objects, such that said first data and said first attribute information are divided into a plurality of second data portions, wherein a second data part is formed for each of said OSDs, said second data part for each OSD being made up of a plurality of second data portions designated to be stored in that OSD;
creating and attaching second attribute information by each said OSD for said second data part designated for that OSD to create said plurality of second objects;
storing the second objects to the OSDs, whereby each OSD stores the second object it created; and
determining parity information for each of the second objects.

19. The method according to claim 18,
wherein the step of determining the parity information includes employing an exclusive-OR function.

20. The method according to claim 18,
wherein parity information is calculated for the second data portions to create a plurality of parity portions, and
further comprising the step of storing the determined parity information in a parity storage device as a parity object including parity data created from the plurality of parity portions and parity data attributes created by the parity storage device.

21. A storage system having a RAID architecture comprising:
means for storing data, said means for storing data including plural object-based storage devices for storing data as an object, wherein an object comprises data and attributes of the data;
means for controlling the means for storing data so as to store data in an object-based fashion, whereby a first object having first data and corresponding first attribute information is divided and dispersed through the means for storing data such that said first data and said first attribute information are divided into a plurality of second data portions, wherein a second data part for storage in each object-based storage device is made up of one or more of said second data portions to be stored in the object based storage device, wherein each object based storage device creates and stores its own second attribute information for each said second data part so that a plurality of second objects are created, said second objects each being stored to one of said object based storage devices; and
means for storing parity information corresponding to the second objects.

22. A storage system comprising:
a plurality of object based storage devices (OSDs) that are accessible as a plurality of logical devices, each of said OSDs storing data as an object, wherein an object comprises data and attributes of the data; and a disk controller which controls transfer of data to the plurality of OSDs, wherein, when a first object is stored to a logical device in an object-based format as a logical object including first data and first attribute information, the first object is divided into plural second objects such that said first data and said first attribute information are divided into a plurality of second data portions, wherein a second data part for storage in each object-based storage device is made up of one or more of said second data portions to be stored in the object based storage device, wherein each object based storage device creates and stores its own second attribute information for each said second data part so that a plurality of second objects are created, and wherein the second attribute information is derived at least in part from said first attribute information and created and stored for each said second data part to create said second objects, wherein each second object is stored to one of the plurality of OSDs, and wherein parity information is calculated for the second objects.

23. The storage system according to claim 22, wherein the first object first attribute information includes a first object ID, wherein the second objects include second object IDs, and wherein the first object ID is the same as the second object IDs.

24. The storage system according to claim 22, wherein the storage system is partitioned to create a plurality of logical partitions, each said partition having a partition ID and encompassing a portion of each of the plurality of OSDs, whereby a particular logical partition is able to be treated as logical object-based storage device.

25. The storage system according to claim 22, wherein said second objects are stored to said OSDs according to a specified stripe size;

wherein the stripe size is determined by a size of the first object.

26. The storage system according to claim 25, wherein the stripe size is determined by dividing the size of the first object into equal portions for each of the OSDs to which the second objects will be stored.

27. The storage system according to claim 22, wherein when data is updated within any of the second objects, the corresponding parity information is also updated.

28. The storage system according to claim 22, wherein, when data is appended to the first object as appended data, the appended data is divided according to a predetermined stripe size to create second appended data portions, the second appended data portions are included in the second data part of one or more of said second objects, and new second attribute information is stored for said second data parts having the second appended data portions to create one or more appended second objects, each appended second object is stored to the physical device that created the appended second object, and new parity information is calculated using an XOR function.

29. The storage system according to claim 28, wherein said OSDs are configured for storing said second objects in stripes of a specified size, and wherein when an amount of the appended data is such that a first one of the plurality of said OSDs does not include an appended second data portion in a particular stripe containing an appended second data portion in another of said OSDs, the new parity information is calculated without considering any other data stored in said first OSD of said plurality of OSDs.

30. The storage system according to claim 29, wherein when an additional appended data portion is appended to said particular stripe of said first OSD of the plurality of OSDs, another new parity information is calculated by XORing most-recently calculated parity information with the additional appended data.

31. The storage system according to claim 22, wherein a stripe size for storing the second objects is determined by concatenating the first data with the first attribute information to create a concatenated data, and dividing a size of the concatenated data by a number of OSDs to which the first object is to be stored as second objects.

32. The storage system according to claim 22, wherein the parity information is calculated using an XOR function.

33. The storage system according to claim 32, wherein the parity information is stored in a parity storage device as a parity object including parity data and parity data attributes, said parity storage device being another object based storage device, wherein parity information is calculated for the second data portions to create a plurality of parity portions, said parity portions making up a data part of the parity object, and wherein said parity data attributes are created and stored by said parity storage device for the parity object stored in that particular parity storage device.

34. A storage system for storing objects, wherein an object comprises data and attributes of the data, said storage system comprising:

a disk controller, said disk controller including a memory, a CPU, and a disk interface; and a plurality of (N+M) object-based storage devices in communication with said disk controller via said disk interface, where both N and M have values that are $\geq 1$, wherein a computer program resides in said memory, said computer program being executable by said CPU for causing said disk controller to receive a first object to be stored and divide said first object into a plurality of N physical objects by dividing data and attribute information of said first object into plural second data portions, wherein particular second data portions for storing in a particular object-based storage device of said N object-based storage devices make up a particular physical object data, wherein each object-based storage device attaches physical object attribute information to its particular physical object data following division of said first object, wherein N said physical objects are stored in said plurality of N storage devices, and wherein said computer program generates M parity data from the N physical objects.

35. The storage system of claim 34,
further including a host interface, said host interface putting said disk controller in communication with a host computer.

36. The storage system of claim 34,
further including a console interface, said console interface putting said disk controller in communication with a console for setting configurations of the storage system.

37. The storage system of claim 34,
wherein said memory comprises a controller memory and a cache memory, and wherein said cache memory is capable of receiving the first object from a host computer prior to storage of the first object on said storage devices.

38. The storage system according to claim 34,
wherein said M storage devices are parity storage devices, and wherein said M parity data are stored in said M parity storage devices as M parity objects, wherein each said parity object includes parity data and parity data attributes, wherein said parity data attributes are created and attached by each of said M parity storage devices for the parity object stored in that particular storage device.

39. In a storage system for storing objects, wherein an object comprises data and attributes of the data, and having a disk controller, said disk controller including a memory, a CPU, and a disk interface, and having at least a plurality of N storage devices and a parity storage device in communication with said disk controller via said disk interface, each of said N and said at least one parity storage devices being an object-based storage device for storing data as an object, a computer program residing in said memory, said computer program being executable by said CPU and causing said disk controller to perform the steps of:
  receiving a first object to be stored;
  dividing said first object into a plurality of N physical objects, by dividing the data and the attributes of the first object into a plural second data portions, said plural second data portions designating each storage device being combined to create physical object data, each said storage device creating and storing physical attributes for the physical object data designating that storage device, such that each physical object includes its own physical object attributes and physical object data;
  storing said N physical objects in said plurality of N storage devices; and
  generating at least one parity data from the physical objects for storage in the parity storage device.

40. The computer program according to claim 39,
wherein said computer program causes said disk controller to further perform a step of, after generating said at least one parity data, storing said at least one parity data in the parity storage device as a parity object, said parity object including the parity data and parity data attributes, wherein said parity data attributes are created and stored by said parity storage devices for the parity object stored in that particular parity storage device.

41. A storage system comprising:
a plurality of object-based storage devices (OSDs) for storing data as an object, wherein an object comprises data and attributes of the data; and
a plurality of logical devices, each logical device corresponding to at least a portion of one or more of the plurality of OSDs,
wherein, when a first object having first data and first attributes is stored to one of said logical devices in an object-based format as a logical object, the first object is divided into plural second objects by dividing the first data and the first attributes into plural second data portions,
wherein said second data portions designated for each OSD are stored by each OSD by combining the second data portions designated for storage in that OSD to create a data part of the second object to be stored in that OSD,
wherein each OSD creates and stores second attribute information for the data part designated for storage in that particular OSD,
wherein each particular said second object is stored to the one of the OSDs that created the second attribute information for that particular second object, and
wherein parity information is calculated for the second objects by using an exclusive-OR (XOR) function.

42. The storage system according to claim 41,
wherein the first object includes a first object ID,
wherein the second objects each include a second object ID, and
wherein the first object ID of the first object is the same as the second object IDs for the second objects.

43. The storage system according to claim 41,
wherein the storage system is partitioned into plural partitions, to create a plurality of logical partitions, each said partition having a partition ID and encompassing a portion of each of the plurality of OSDs, whereby a particular logical partition is able to be treated as a logical object-based storage device.

44. The storage system according to claim 41,
wherein data is stored to said OSDs according to a specified stripe size;
wherein the stripe size for the plurality of OSDs is determined from a size of the first object.

45. The storage system according to claim 44,
wherein the stripe size is determined by concatenating the first data with the first attribute information to create a concatenated data, and dividing a size of the concatenated data by a quantity of the OSDs to which the first object is to be stored as second objects.

46. The storage system according to claim 41,
wherein when the first object is updated, a corresponding second data portion is updated within a corresponding second object, and the parity information for the corresponding second data portion is also updated.

47. The storage system according to claim 41,
wherein when data is appended to the first object as appended data, the appended data is divided according to a predetermined stripe size to create second appended data portions, the second appended data portions are included in corresponding data parts of the corresponding second objects, and new second attribute information is created and stored for said second corresponding data part by the OSDs storing the corresponding second objects to create one or more appended second objects,
each appended second object is stored to the OSD that created the appended second object, and
a new parity information is calculated using an XOR function.

48. The storage system according to claim 47,
wherein said OSDs are configured for storing said second objects in stripes of a specified size, and wherein when an amount of the appended data is such that a first one of the plurality of said OSDs does not include an appended second data portion in a particular stripe containing an appended second data portion in another of said OSDs, the new parity information is calculated without considering any other data stored said first OSD of said plurality of OSDs.

49. The storage system according to claim 48,
wherein when an additional appended data portion is appended to said particular stripe of said first OSD of the plurality of OSDs, another new parity information is calculated by XORing most-recently calculated parity information with the additional appended data portion.

50. The storage system according to claim 41,
a stripe size for storing the second objects is determined by concatenating the first data with the first attribute information to create a concatenated data, and dividing a size of the concatenated data by a number of OSDs to which the first object is to be stored as second objects.

51. The storage system according to claim 41,
wherein the parity information is stored in a parity storage device as a parity object including parity data and parity data attributes,
wherein parity information is calculated for the second data portions to create a plurality of parity portions, said parity portions making up a data part of the parity object, and
wherein said parity data attributes are created and stored by said parity storage device for the parity object stored in that particular parity storage device.

* * * * *